Figure 1:
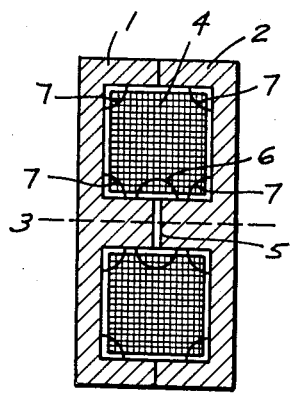

April 27, 1965  
W. P. RAUB  
3,181,096  
INDUCTANCE COIL WITH SYMMETRICAL WINDINGS AND  
LOW CAPACITANCE BETWEEN WINDINGS  
Filed Feb. 25, 1960

INVENTOR.
WERNER PAUL RAUB
BY Hane and Nydick

ATTORNEYS

United States Patent Office 3,181,096
Patented Apr. 27, 1965

3,181,096
INDUCTANCE COIL WITH SYMMETRICAL WINDINGS AND LOW CAPACITANCE BETWEEN WINDINGS
Werner Paul Raub, Tumba, Sweden, assignor to Telefonaktiebolaget L M Ericsson, Stockholm, Sweden, a corporation of Sweden
Filed Feb. 25, 1960, Ser. No. 11,069
Claims priority, application Sweden, Mar. 4, 1959, 2,064/59
2 Claims. (Cl. 336—69)

The present invention relates to inductance coils comprising two or more symmetrical windings, especially for line transformers or loading coils with potted cores.

In order to avoid cross talk, for instance between loaded telephone lines, it is necessary that the winding branches of the loading coils are fully symmetrical in respect to their electrical properties so as not to cause unbalance of the telephone lines. Thus it is important that the winding branches of the loading coil are as equal as possible in respect to resistance and inductance as well as to capacity between the different branches and between each one of these and the core of the coil.

There always exist more or less important leakage flux fields in the winding space of the core, especially along the intersecting lines of the space limiting surfaces. It is therefore necessary to design the coil in such a way that the different winding branches are as far as possible equally exposed to the influence of leakage flux fields.

In a known method of winding as described in the German Patent 912,111 each branch is divided into fractional windings, the number of which equals the number of branches, the fractional windings being located in such a way that only fractional windings pertaining to different branches are placed close to each other and that the different branches are uniformly dispersed throughout the winding space. This arrangement gives a fairly good equalization of the inductance and the capacitance of the branches, but has the disadvantage that the fractional windings within each branch have to be connected together and soldered after the mounting. This is a fairly time-consuming and troublesome task. If a better equalization is required, it is of course possible to divide the branches into still more fractional windings, which would result in increased work of connecting these fractional windings together. It is also to be noted that an increased number of fractional windings causes an increase of the capacitance between the branches, an effect that is normally not desirable.

It is an object of the invention to provide an inductance coil of the general kind above referred to, the branches of which are well equalized in respect to their electrical properties, and which coil has low capacitance values between the branches.

The coil is wound in a single winding operation, whereby all the branch conductors are wound simultaneously, with winding sections of an equal number of turns in each layer. Each winding section is wound helically in an axial direction opposite to that of each adjacent section. At the meeting points—that is, where two branch conductors meet—in the first layer, the windings are carried on with the axial winding direction unchanged so that each one of the winding sections in the second layer will be located concentrically outside a section of the first layer pertaining to a different branch conductor. The axial winding directions of all branch conductors may be kept unchanged through a few more layers, except of course where the conductors reach the end faces of the coil and necessarily must change. In order to reduce the capacitance between the branch conductors, however, the winding directions of all conductors are changed at all meeting points in a plurality of layers throughout the coil windings. By such changes in the axial winding direction, the sections of any branch conductor are wound concentrically outside sections of the same conductor, and only the end turns of each section will be located next to a turn of another branch section.

To improve the equalization of the branches as much as possible, the axial winding direction is kept unchanged in the last layers of the coil, as in the first layers, and furthermore, in a few layers half way through the coil winding. By such winding of the coil, a satisfactory equalization of the branch windings is achieved, while the capacitance values are kept low.

Figure 2:
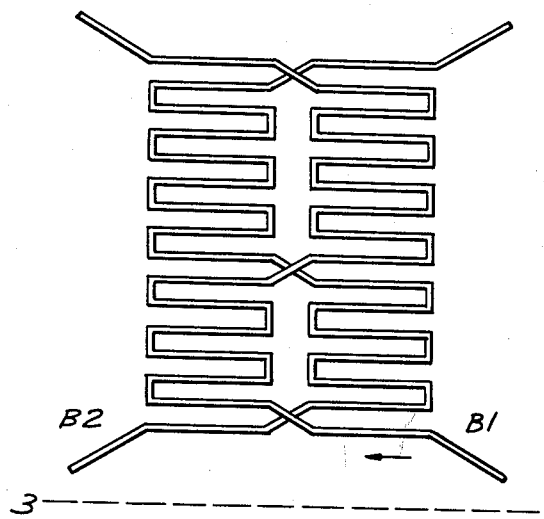
Figure 3:
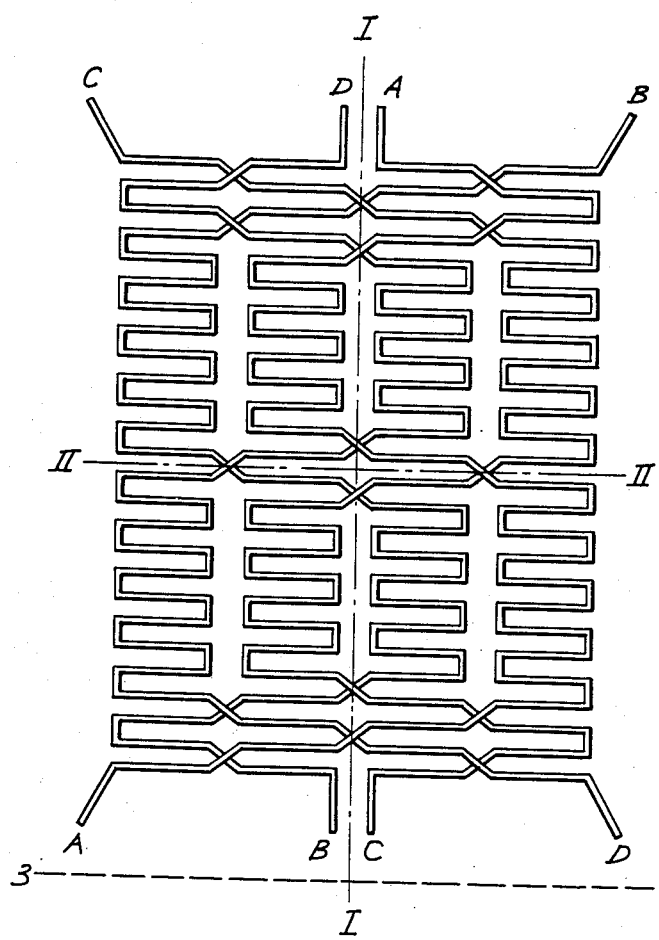

The invention will be further described by means of several embodiments with reference to the accompanying drawings, in which FIG. 1 shows a loading coil with potted core in cross-section, and FIGS. 2 and 3 in schematic form show examples of windings with two and four branches respectively.

A core of ferrite, composed of two halves 1 and 2, is cylindrically formed about its center axis 3 and is at its center part provided with an air gap 5. The potted core encloses a winding 4 that in ready wound state has been put into the same. With potted cores of this form disturbing leakage flux fields appear round the center part at the air gap as well as along the boundary lines of the potted core bottoms, which regions in the figure are indicated by circular arcs 6 and 7. In order to avoid unbalance of the winding branches due to the influence of the leakage flux fields, the branches should be wound in such a way that they as far as possible are equally influenced by the different leakage fields. The way this is achieved is shown in FIG. 2.

In FIG. 3 the first layers of a loading coil with four conductors for phantom circuits are shown. The two windings B and C are started at the center of the first layer and wound helically toward the end sides, while the other two windings A and D are started at the sides and wound helically toward the center of the coil. The axial winding direction of every other winding section is directed toward one side, while the others are directed toward the other side. In the first few layers the conductors change their axial winding directions only at the end sides of the coil. Thereafter a plurality of layers follow up to approximately half way through the coil. In each of these layers the axial winding directions are changed at every meeting point. Thereupon the winding directions are left unchanged at a few meeting points, and another plurality of layers follow in which the axial winding directions are again changed at every meeting point. Finally, in the last few layers the conductors change their axial winding directions only at the end sides of the coil, in the same manner as in the first few layers of the coil.

As can be seen from FIG. 2, the different branches are symmetrically located in the available winding space. Thus the branches A and C are located symmetrically with the branches D and E, respectively, in reference to the vertical center line I—I. Similarly, the windings A and D are located symmetrically with branches C and B, respectively, in reference to the horizontal center line II—II.

It is also possible to use two equal loading coils for each phantom circuit, whereby each coil occupies half of the winding space in a potted core. These coils can then be wound in the same way as above indicated for coils with two winding branches.

The indicated winding arrangement is naturally not limited to use for loading coils but can with advantage be used for the winding of line transformers or any inductance coils with two or more winding branches for which a good symmetry is required.

I claim:

1. An inductance coil wound from two continuous conductors about a core in a plurality of concentric layers, each layer comprising two symmetrical, axially aligned sections, each section being wound from one conductor, the two sections of any layer being wound helically in opposite axial directions between the respective ends of the coil and a midpoint thereof, the thus formed turns of both conductors continuing in the same axial winding direction within the first two layers, the axial winding directions of both conductors changing at a midpoint in a plurality of subsequent layers within the first half of the coil winding, the windings of both conductors continuing in the same axial winding directions within two layers approximately half way through the coil, the axial winding directions of both conductors changing at a midpoint in a plurality of layers within the second half of the coil winding, the windings of both conductors continuing in the same axial winding directions within the two last layers.

2. An inductance coil wound from four continuous conductors about a core in a plurality of concentric layers, each layer comprising four symmetrical axially aligned sections, each section being wound from one conductor helically in an axial direction opposite to that of an adjacent section, the thus formed turns of all four conductors continuing in the same axial winding directions at points at which any two branch conductors meet within a few first layers except where the conductors reach the end sides of the coil, the axial winding directions of all four conductors changing at the meeting points in a plurality of subsequent layers within the first half of the coil winding, each conductor continuing in the same winding direction within a few layers approximately half way through the coil, the axial winding directions of all four conductors changing at the meeting points in a plurality of subsequent layers within the second half of the coil winding, all four conductors continuing in the same axial winding directions within a few last layers except where the conductors reach the end sides of the coil.

References Cited by the Examiner

UNITED STATES PATENTS 329,772 11/85 Perrin _____ 336—188 X
2,558,566 6/51 Jorgensen _____ 336— 183 X

FOREIGN PATENTS 641,056 8/50 Great Britain.

JOHN F. BURNS, Primary Examiner.

N. BERGER, MILTON O. HIRSHFIELD, Examiners.